March 7, 1950     S. C. MARSH     2,499,403
LIQUEFIED GAS STORAGE AND SUPPLY
Filed June 8, 1946
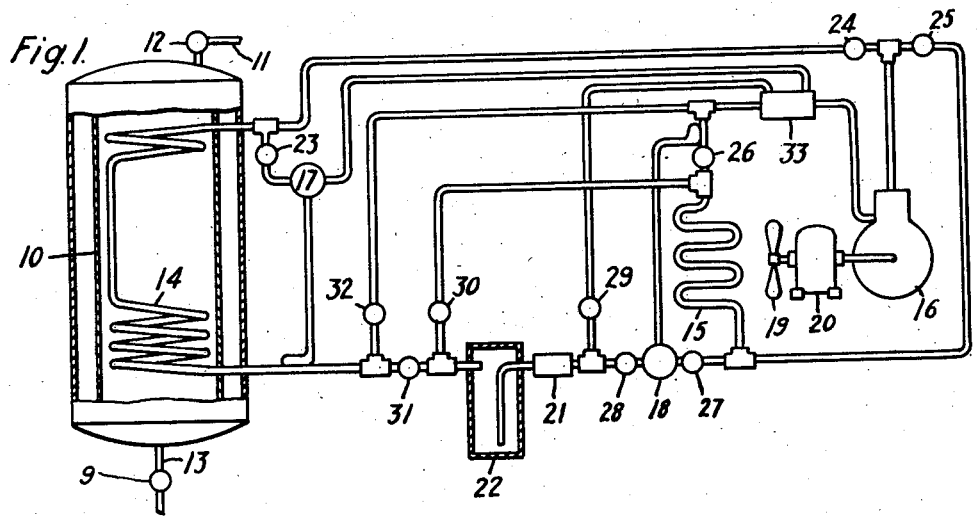
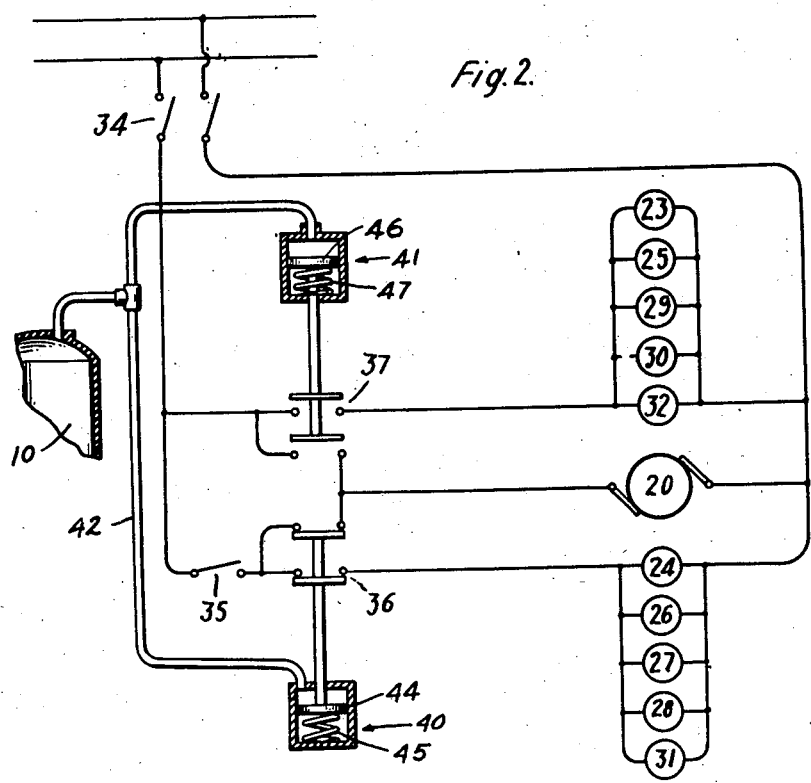
INVENTOR.
SIDNEY C. MARSH
BY
J. William Carson
ATTORNEY Patented Mar. 7, 1950

2,499,403

UNITED STATES PATENT OFFICE 2,499,403

LIQUEFIED GAS STORAGE AND SUPPLY

Sidney Clarke Marsh, Hohokus, N. J., assignor to Specialties Development Corporation, Bloomfield, N. J., a corporation of New Jersey Application June 8, 1946, Serial No. 675,378

11 Claims. (Cl. 62—1)

This invention relates to the storage of liquefied gas at lower than usual atmospheric temperature and its supply as a vapor at a predetermined pressure; and particularly to a method and apparatus for liquefying gas in solid phase, storing the liquefied gas and subsequently vaporizing the liquefied gas for supply to other apparatus such as carbonators utilizing carbon dioxide for beverage purposes.

In the storage of liquefied gas in large quantities in a container, it is desirable to refrigerate the stored gas to maintain the same at a low temperature and a correspondingly low vapor pressure whereby the wall thickness of the container may be reduced with consequent advantages such as saving in weight, material and cost.

It is contemplated to charge a relatively large storage container with gas in solid phase and to liquefy the charge for storage in the container at a low temperature and its correspondingly low vapor pressure. It is necessary, initially, to supply heat to the storage container in order to liquefy the gas, and subsequently to refrigerate the container from time to time in order to maintain the contents at a relatively low subatmospheric temperature because of the leakage of heat therein.

A reverse cycle refrigerating system may be utilized for accomplishing the foregoing wherein, during one cycle of operation, hot refrigerant is placed in thermal contact with the contents of the container to melt the solidified gas, and, during the the reverse cycle of operation, cold refrigerant serves to maintain the liquefied gas at a predetermined low temperature.

It is customary to insulate such a storage container against the entrance of heat in order to aid in maintaining the contents at uniform subatmospheric temperature after the desired temperature has been established. However, if gas in vapor phase is withdrawn from the container, the vaporization of liquefied gas taking place within the container will have a marked refrigerating action so as to materially reduce the temperature within the container thus requiring the addition of heat thereto in order to maintain a constant vapor pressure. Theoretically, if gas is removed very rapidly, a substantial amount of the liquid within the tank will be solidified by the refrigerating effect of the vaporizing gas.

Inasmuch as the container is well insulated, heat will have to be supplied by some heating means within the container such as a coil because direct transfer of heat from the surrounding atmosphere is held to a minimum by the insulation. Hence, it is proposed to utilize the same source of heat as utilized for initially liquefying the gas, namely reverse cycle refrigeration, in order to counteract the refrigerating effect due to the withdrawal of vapor phase gas from the container in order to maintain a constant and uniform pressure within the container.

Accordingly, an object of the invention is to provide a method and apparatus for liquefying solidified gas and subsequently supplying this gas in vapor phase in a simpler way than heretofore practiced.

Another object is to provide apparatus for automatically conditioning or maintaining liquefied gas at a predetermined temperature and pressure.

Another object is to supply gas in vapor phase to further equipment such as a carbonator for beverage purposes while automatically maintaining the stored gas at a predetermined temperature and pressure.

Another object is to utilize a single source of heat for initially liquefying solidified gas and subsequently for counteracting the refrigerating effect due to the withdrawal of the vapor phase gas.

A further object is to provide apparatus of the foregoing character which is simple and durable in construction, economical to manufacture and effective in its operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein:

Figure 1 is a diagrammatic view illustrating a system or apparatus in accordance with the invention for practicing the method thereof.

Figure 2 is a wiring diagram for the automatic controls of the system shown in Figure 1.

Referring to Figure 1, there is shown a storage tank 10 of conventional construction which is preferably formed of sheet steel and is heavily insulated to retard the entrance of heat. The tank 10 is provided with a conventional cover, not shown, to permit the introduction of solid phase gas and has a conduit 11 leading from the upper portion thereof for the discharge of vapor phase gas from the tank. A manually controlled valve 12 may be located in this conduit. A conduit 13 having a valve 9 therein may be placed at the lower portion of the tank 10 to permit draining of liquefied gas and foreign matter therefrom. In lieu of charging with solidified gas, the tank 10 may be charged with liquefied gas as is well known in the art.

A heat exchanger which may be in the form of a coiled conduit 14 is located within the tank 10. Connected to this heat exchanger by conduits is a second heat exchanger 15 which is preferably exposed to the atmosphere but may be exposed to other convenient fluid heat exchange media. In addition, a compressor 16 and expansion valves 17 and 18 are provided and connected into the system as disclosed in Figure 1.

A fan 19 is preferably used to increase the efficiency of the heat exchanger 15 by creating a flow of fluid heat exchange media in thermal contact with the heat exchanger. The fan 19 is preferably driven by an electric motor 20 or other convenient source of power which also drives the compressor 16. In addition, a conventional dehydrator 21 and a combined refrigerant reservoir and trap 22 may be included in the system. Control valves 23, 24, 25, 26, 27, 28, 29, 30, 31 and 32 are provided in order to control the flow of refrigerant within the system as hereinafter explained.

The expansion valves 17 and 18 are preferably of the thermostatically controlled type and are controlled by temperature sensing elements in thermal contact with the conduits on the opposite side of the heat exchangers 14 and 15, respectively, in order to prevent loading the heat exchangers with more liquid refrigerant than can be evaporated therein which might cause consequent danger of passing slugs of liquid refrigerant to the compressor.

In addition, a conventional heat exchanger 33 may be provided on the intake side of the compressor 16 in order to transmit heat from the hot compressed refrigerant and assure against entrance of condensed refrigerant into the compressor with attendant injury of the compressor. The system above described is charged with a conventional refrigerant.

Control valves 23 to 32, inclusive, are normally in the closed position. These valves are of the solenoid type, are actuated into the open position by energizing of the solenoid, and return to closed position when the solenoid is no longer energized.

Referring to Figure 2, an electrical circuit is provided for controlling the valves as well as actuation of the motor 20 for the compressor and fan. This circuit is energized by a double pole, single throw electric switch 34 which is connected to a source of electric current. If desired pneumatic means may be utilized for actuating the valves herein described as being solenoid operated. In addition, a manually controlled single pole, single throw electrical switch 35 may be placed in the circuit controlling the heating cycle.

A pressure actuated switch 36 responsive to vapor pressure within tank 10 is placed in series with the switch 35 in the circuit so that, when the switches 34 and 35 are in the closed position, the control valves 24, 26, 27, 28 and 31 as well as motor 20 are energized, thus forming a compressor condenser expander heat exchange circuit in which the heat exchanger 14 within the tank 10 serves as a condenser and the heat exchanger 15 serves as an evaporator.

A second pressure actuated switch, responsive to vapor pressure within tank 10 above a predetermined amount and above the pressure at which the heating control circuit just described is de-energized, is provided so that the control valves 23, 25, 29, 30 and 32 as well as motor 20 are energized. The energization of this circuit forms a compressor condenser expander heat exchange system in which the heat exchanger 15 serves as a condenser and the heat exchanger 14 as an evaporator, thus cooling the contents of the tank 10 until the pressure within the tank 10 has dropped sufficiently to de-energize the control circuit.

As shown in Figure 2, the switches 36 and 37 may be actuated by pressure responsive devices 40 and 41, respectively, which are operatively connected to the upper end of the tank 10 by a conduit 42.

The device 40 comprises a piston 44 for operating the contact elements of the switch and a spring 45 for normally positioning the piston to maintain the switch closed but adapted to be overcome to permit opening of the switch in response to a predetermined pressure in the tank 10.

The device 41 comprises a piston 46 for operating the contact elements of the switch 37, and a spring 47 for normally positioning the piston to maintain the switch open but adapted to be overcome to permit closing of the switch in response to a predetermined pressure in the tank 10.

Inasmuch as the pressure of a gas partly in liquid and partly in vapor phase increases with its temperature, it is obvious that the pressure responsive switches 36 and 37 may be replaced by switches responsive to temperature of the gas within the tank 10 without departing from the scope of this invention.

*Operation*

In operation, in accordance with the invention, the tank 10 is charged with a solidified gas such as carbon dioxide ice through a conventional cover not shown. After charging the tank 10, the valve 12 as well as drain conduit and the valve 13 must be in the closed position. In lieu of charging with solidified gas, the tank 10 may be charged, if preferred, with liquefied gas.

The manually controlled switches 34 and 35 are then closed, thus energizing the electrically controlled circuit and the heating cycle of this circuit. Inasmuch as there is a low temperature and correspondingly low vapor pressure within the tank 10, the switch 36, responsive to lower than predetermined pressure within the tank 10, will be in the closed position and therefore the control valves 24, 26, 27, 28 and 31 and the electric motor 20 will be energized, thus causing the flow of hot refrigerant from the compressor to pass directly to the heat exchanger 14 within the tank 10 where heat is transferred from the refrigerant to the cold liquefied gas therein, and subsequently through the expansion valve 18 into the heat exchanger 15 where the expanded cold vaporized refrigerant accumulates heat from the atmosphere or other external fluid medium. The refrigerant is then passed to the compressor for compressing and recycling. In this instance, the heat exchanger 14 operates as a condenser and the heat exchanger 15 as an evaporator in a compressor condenser expander heat exchange system.

Upon continued heating of the tank 10, the contents therein will be converted to the liquid state and the vapor pressure will be increased. When the pressure has increased to a predetermined amount, the pressure actuated switch 36 will be caused to open, thereby de-energizing and causing the valves 24, 26, 27, 28 and 31 to again close and the motor 20 operating the compressor 16 to stop. The manually controlled switch 35 should be left in closed position for subsequent automatic operation of the heating cycle. The predetermined pressure, at which the pressure responsive switch 36 is caused to open, is chosen within the pressure range at which it is desired to withdraw vaporized gas for subsequent use.

Upon continued leakage of heat into the tank 10, the temperature of the contents will gradually increase unless overcome by other factors hereinafter considered, resulting in a correspondingly increased vapor pressure therein. Upon the attainment of a predetermined pressure in the tank 10, higher than that causing the opening of the switch 36, the pressure responsive switch 37 is caused to close, thus energizing the control valves 23, 25, 29, 30, 32 and the compressor motor 20. This predetermined pressure is still within but at the upper limit of the range of pressures at which it is desired to draw gas from the tank 10.

The above-mentioned actuation of these control valves and the compressor motor permits the hot compressed refrigerant from the compressor 16 to pass to the heat exchanger 15 where the refrigerant is cooled and condensed by the extraction of heat therefrom to the atmosphere and then through conduits and the expansion valve 17 to the heat exchanger 14, wherein expansion of cooled liquid refrigerant occurs, thus effecting refrigeration of the contents of the tank 10. This cycle is continued until such time as the contents of the tank 10 have been cooled to the point at which the vapor pressure therein drops below that required to actuate the pressure responsive switch 37, at which time the circuit is opened. The control valves 23, 25, 29, 30 and 32 then resume their closed position and the compressor motor 20 is no longer energized.

In this cycle, the heat exchanger 15 operates as a condenser and the heat exchanger 14 operates as an evaporator in a compressor condenser expander heat exchange circuit, thus extracting heat from the contents of the tank 10 and passing the extracted heat to the atmosphere.

As already stated, withdrawal of vaporized gas from the tank 10 will cause a marked refrigeration of the gas remaining therein due to the evaporation of additional liquefied gas to replace that withdrawn. Inasmuch as the tank 10 is heavily insulated to permit storage of liquefied gas without excessive refrigeration or excessive pressure developing therein, this loss of heat of the contents of the tank 10 would be very slowly replaced by leakage of heat through the insulation of the tank, and the vapor pressure within the tank 10 would soon fall below the allowable range of pressure at which it is desired to supply this gas.

However, in the above described installation, upon a drop in pressure of the contents of the tank 10 below the predetermined range, the pressure responsive switch 36 is actuated as above described in order to cause the addition of heat to the gas within the tank 10 and thus increase the vapor pressure to within the desired range, at which time, as above described, the switch 36 is again opened, thus stopping the addition of such heat.

From the foregoing description, it will be seen that the present invention provides a simple workable system for the supply of vaporized gas at a predetermined pressure for further use from a large body of liquefied gas. By providing the necessary controls and connections there is provided an automatic means, by using the same equipment, of either heating or refrigerating as required the contents of the tank.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. Apparatus for conditioning and supplying normally gaseous material comprising chamber means adapted to contain a body of liquefied material, means for withdrawing vaporized material from said chamber, heat exchange means in thermal contact with said material within said chamber means, means to cause condensation or vaporization of a fluid medium within said heat exchange means, and means responsive to the vapor pressure within said chamber means for controlling the flow of said fluid medium to said heat exchange means.

2. Apparatus for conditioning and supplying normally gaseous material comprising chamber means adapted to contain a body of liquefied material, means for withdrawing vaporized material from said chamber means, a heat exchange system of the compressor condenser expander type including heat exchange means in thermal contact with said material within said chamber means to which heat is adapted to be added, and means responsive to the vapor pressure within said chamber means for controlling the operation of said heat exchange system.

3. Apparatus for conditioning and supplying normally gaseous material comprising chamber means adapted to contain a body of liquefied material, means for withdrawing vaporized material from said chamber means, a heat exchange system of the compressor condenser expander type including heat exchange means in thermal contact with said material within said chamber means and heat exchange means exposed to the atmosphere, and means responsive to a physical condition of the material within said chamber means for controlling the operation of said heat exchange system to alternately add heat to one of said heat exchange means and withdraw heat from the other of said heat exchange means.

4. Apparatus for conditioning and supplying normally gaseous material comprising chamber means adapted to contain a body of liquefied material, means for withdrawing vaporized material from said chamber means, a reversible cycle heat exchange system including heat exchange means in thermal contact with said material within said chamber means to which heat is adapted to be added or from which heat is adapted to be withdrawn, means responsive to an increase over a predetermined amount of kinetic energy of the material within said chamber means to actuate the cooling cycle of said reversible cycle system, and means responsive to a decrease of such energy below a predetermined amount lower than said above mentioned predetermined amount to actuate the heating cycle of said reversible cycle system.

5. Apparatus for conditioning and storing liquefied normally gaseous material at a predetermined temperature and pressure comprising chamber means adapted to contain a body of said material, a refrigerating system including heat exchange means in thermal contact with the material in said chamber means constructed and arranged to provide a compressor condenser expander heat exchange circuit, valve means in said circuit operable to reverse the flow of heat exchange medium in said circuit, means for automatically operating said valve means, control means for rendering certain of said operating means effective when the material is below a predetermined temperature and pressure whereby said circuit is operated to supply heat to said heat exchange means, and control means for rendering certain other of said operating means effective when the material is above a predetermined temperature and pressure whereby said circuit is operated to remove heat from said heat exchange means.

6. Apparatus for conditioning and storing liquefied normally gaseous material at a predetermined temperature and pressure comprising chamber means adapted to contain a body of said material, a refrigerating system including heat exchange means in thermal contact with the material in said chamber means constructed and arranged to provide a compressor condenser expander heat exchange circuit, normally closed valves in said circuit operable to reverse the flow of heat exchange medium in said circuit, means for automatically operating said valves, control means for rendering certain of said operating means effective to open the valves operated thereby when the material is below a predetermined temperature and pressure whereby said circuit is operated to supply heat to said heat exchange means, and control means for rendering certain other of said operating means effective to open the valves operated thereby when the material is above a predetermined temperature and pressure whereby said circuit is operated to remove heat from said heat exchange means.

7. Apparatus for conditioning and storing liquefied normally gaseous material at a predetermined temperature and pressure comprising chamber means adapted to contain a body of said material, a refrigerating system including heat exchange means in thermal contact with the material in said chamber means constructed and arranged to provide a compressor condenser expander heat exchange circuit, solenoid operated valves in said circuit operable to reverse the flow of heat exchange medium in said circuit, an electrical circuit for one group of solenoids, automatic switch means adapted to close said solenoid circuit when the material is below a predetermined temperature and pressure whereby said heat exchange circuit is operated to supply heat to said heat exchange means, a second electrical circuit for another group of solenoids, and automatic switch means to close said second solenoid circuit when the material is above a predetermined temperature and pressure whereby said heat exchange circuit is operated to remove heat from said heat exchange means.

8. Apparatus for conditioning and storing liquefied normally gaseous material at a predetermined temperature and pressure comprising chamber means adapted to contain a body of said material, a refrigerating system including heat exchange means in thermal contact with the material in said chamber means and a motor driven compressor constructed and arranged to provide a compressor condenser expander heat exchange circuit, solenoid operated valves in said circuit operable to reverse the flow of heat exchange medium in said circuit, an electrical circuit for one group of solenoids, automatic switch means adapted to close said solenoid circuit when the material is below a predetermined temperature and pressure whereby said heat exchange circuit is operated to supply heat to said heat exchange means, a second electrical circuit for another group of solenoids, automatic switch means to close said second solenoid circuit when the material is above a predetermined temperature and pressure whereby said heat exchange circuit is operated to remove heat from said heat exchange means, and switch means simultaneously operable with either of said automatic switch means to effect operation of the compressor motor.

9. Apparatus for conditioning and storing liquefied normally gaseous material at a predetermined temperature and pressure comprising chamber means adapted to contain a body of said material, a refrigerating system including heat exchange means in thermal contact with the material in said chamber means constructed and arranged to provide a compressor condenser expander heat exchange circuit, solenoid operated valves in said circuit operable to reverse the flow of heat exchange medium in said circuit, an electrical circuit for one group of solenoids, automatic switch means adapted to close said solenoid circuit when the material is below a predetermined temperature and pressure whereby said heat exchange circuit is operated to supply heat to said heat exchange means, a second electrical circuit for another group of solenoids, and automatic switch means to close said second solenoid circuit when the material is above a predetermined temperature and pressure whereby said heat exchange circuit is operated to remove heat from said heat exchange means, and manually operable switch means in said first solenoid circuit.

10. A method of handling normally gaseous materials comprising maintaining a supply of liquefied normally gaseous material in bulk storage, circulating a refrigerant in heat exchange relation with the material in bulk storage which refrigerant is conditioned to withdraw the heat leaking into the stored material from its surroundings and thereby maintain the material at a substantially constant predetermined temperature and pressure, withdrawing a portion of the material in gaseous state resulting in a reduction in the temperature and pressure of the material in bulk storage, and circulating said refrigerant in heat exchange relation with the material in bulk storage while said refrigerant is conditioned to add heat to the material to reestablish its predetermined temperature and pressure.

11. A method of handling normally gaseous materials comprising maintaining a supply of liquefied normally gaseous material in bulk storage, circulating a refrigerant in heat exchange relation with the material in bulk storage which refrigerant is conditioned to withdraw the heat leaking into the stored material from its surroundings and thereby maintain the material at a substantially constant predetermined temperature and pressure, withdrawing a portion of the material in gaseous state resulting in a reduction in the temperature and pressure of the material in bulk storage, circulating said refrigerant in heat exchange relation with the material in bulk storage while said refrigerant is conditioned to add heat to the material to reestablish its predetermined temperature and pressure, and controlling the conditioning and circulation of said refrigerant in response to the temperature and pressure of the material in bulk storage.

SIDNEY CLARKE MARSH.

REFERENCES CITED

The following references are of record in the file of this patent:

UNITED STATES PATENTS

| Number | Name | Date |
|---|---|---|
| 2,166,915 | Little | July 18, 1939 |
| 2,180,231 | Geertz | Nov. 14, 1939 |
| 2,278,192 | Cantacuzene | Mar. 31, 1942 |
| 2,388,314 | Eisinger | Nov. 6, 1945 |
| 2,418,446 | Anderson | Apr. 8, 1947 |